(12) United States Patent
Hsueh

(10) Patent No.: US 10,965,466 B2
(45) Date of Patent: Mar. 30, 2021

(54) ESTIMABLE PROOF-OF-WORK FOR BLOCKCHAIN

(71) Applicant: NATIONAL TAIWAN UNIVERSITY, Taipei (TW)

(72) Inventor: Chih-Wen Hsueh, Taipei (TW)

(73) Assignee: National Taiwan University, Taipei (TW)

( * ) Notice: Subject to any disclaimer, the term of this patent is extended or adjusted under 35 U.S.C. 154(b) by 181 days.

(21) Appl. No.: 16/053,845

(22) Filed: Aug. 3, 2018

(65) Prior Publication Data

US 2020/0044854 A1 Feb. 6, 2020

(51) Int. Cl.
*H04L 29/06* (2006.01)
*H04L 9/32* (2006.01)
*H04L 9/06* (2006.01)
*G06F 11/34* (2006.01)
*G06F 17/18* (2006.01)

(52) U.S. Cl.
CPC ........ *H04L 9/3236* (2013.01); *G06F 11/3409* (2013.01); *G06F 17/18* (2013.01); *H04L 9/0637* (2013.01); *H04L 9/3247* (2013.01); *H04L 2209/38* (2013.01)

(58) Field of Classification Search
CPC .. H04L 2209/38; H04L 2209/56; G06F 21/64
See application file for complete search history.

(56) References Cited

PUBLICATIONS

Ozisik, Pinar et al. "Estimation of Miner Hash Rates and Concensus on Blockchains." Jul. 1, 2017. pp. 1-13.*

* cited by examiner

*Primary Examiner* — Jason K Gee
(74) *Attorney, Agent, or Firm* — JCIPRNET

(57) ABSTRACT

A method for calculating a number of proof-of-work to measure how much work has been done in one block mining, includes the following steps: using a low hash, wherein the low hash value corresponding to a low nonce is not greater than a predetermined target value; using a high hash, wherein the high hash value corresponding to a high nonce is higher than the same target value; and calculating the number of proof-of-work according to the low hash value and the high hash value. The low hash value is the lowest hash value in one block mining. The high hash value is the highest hash value in the same block mining.

3 Claims, 8 Drawing Sheets

| | $m = 1$ | $m > 1$ |
|---|---|---|
| $P(i,j\|m)$ | $0$ | $(n^m - 2(n-1)^m + (n-2)^m)p^m$ |
| $P(n\|m)$ | $p^{m-1}$ | $(N - n + 1)(n^m - 2(n-1)^m + (n-2)^m)p^m$ |
| $\bar{n} = \sum_{n=1}^{N} n P(n\|m)$ | $N - 2p^m S_m(N-1),\ \int_0^n x^m < S_m(x) = \sum_{k=1}^{x} k^m < \int_1^{n+1} x^m$ | |
| $P(m\|i,j)$ | $P(i,j\|m)/P(i,j)$ | |
| $P(i,j) = \sum_{m=1}^{M} P(i,j\|m)$ | $f_1(p)$ | $f_1(np) - 2f_1((n-1)p) + f_1((n-2)p)$ |
| | $f_1(x) = \sum_{k=1}^{M} x^k = \begin{cases} M &, x = 1 \\ (x - x^{M+1})/(1-x) &, \text{otherwise} \end{cases}$ | |
| $\bar{m} = \sum_{m=1}^{M} m P(m\|i,j)$ | $f_2(p)/P(i,j)$ | $(f_2(np) - 2f_2((n-1)p) + f_2((n-2)p))/P(i,j)$ |
| | $f_2(x) = \sum_{k=1}^{M} k x^k = \begin{cases} \frac{M(M+1)}{2} &, x = 1 \\ (f_1(x) - M x^{M+1})/(1-x) &, \text{otherwise} \end{cases}$ | |
| $Var(\bar{m}) = \sum_{m=1}^{M} m^2 P(m\|i,j) - \bar{m}^2$ | $f_3(p)/P(i,j) - \bar{m}^2$ | $(f_3(np) - 2f_3((n-1)p) + f_3((n-2)p))/P(i,j) - \bar{m}^2$ |
| | $f_3(x) = \sum_{k=1}^{M} k^2 x^k = \begin{cases} \frac{M(M+1)(2M+1)}{6} &, x = 1 \\ (2f_2(x) - f_1(x) - M^2 x^{M+1})/(1-x) &, \text{otherwise} \end{cases}$ | |

FIG. 3

ESTIMABLE PROOF-OF-WORK FOR BLOCKCHAIN

FIELD OF THE DISCLOSURE

The present disclosure relates to a proof-of-work for blockchain, and more particularly to an estimable proof-of-work for blockchain.

BACKGROUND OF THE DISCLOSURE

Blockchain was named after the technology was first proposed in the Bitcoin white paper. It was implemented later in Bitcoin, the world's first decentralized digital currency, and the source code is open. Blockchain consists of a distributed database that maintains continuously growing records of data called blocks. Each block contains a timestamp of its birth, a link to a previous block and a hash value of the header representing the whole previous block. A hash function in cryptography is a one-way function to map data of arbitrary size to data of fixed size such that it is very difficult to reconstruct the input data from the output hash value. Therefore, these blocks are hash-chained, forming the so-called blockchain, which is inherently resistant to modification of the data. In other words, any modification in a block results in inconsistency of its hash value in the next block, as well as in the following blocks.

In Bitcoin, users can run the Bitcoin program at any computer nodes on the Internet, forming the Bitcoin network. The program has many options to choose for applying Bitcoin rules. Since the source code is open, users can also customize their own code as long as it conforms to the Bitcoin rules. A full node in Bitcoin network downloads every block and transaction and checks them against core consensus rules. A full-node user, called a miner, follows all Bitcoin rules, while other users depend on miners to only send and receive transactions, taking less responsibility and workload. At first, miners get a copy of all blocks of the blockchain from full nodes. Users send transactions to each other by broadcasting the transactions as Internet packets to miners for confirmation. Miners simultaneously collect broadcast transactions and each one works on his/her own new block. By completing a hash-based proof of work (PoW), any miner can get the right to append a new block to the blockchain. By a consensus protocol, the miners will decide which new blocks will be accepted in the blockchain. The process is called mining because the miners get rewards once the block is confirmed. If a block is confirmed, fixed amount of bitcoins, decreasing by half every 4 years, and total transaction fees of the transactions recorded in the block will be given to the miner as a block reward. By trying a number, nonce, in its own mining block header, the PoW asks the miners to find a hash value of the mining block header to be not greater than a number, target. Once the nonce is found, the new block is mined and waits for confirmation. The smaller the target value, the more difficult to mine a block. The target value is adjusted every 2016 blocks mined so that the time to mine a block, called the block time, has an average of 10 minutes. A number inversely proportional to the target value, called difficulty, represents the total mining computing power. Another number, hash rate, the estimated total hash rate of the blockchain, also indicates the total mining computing power. However, no indicator represents the mining computer power of individual miners unless we do long-term statistical analysis of the blocks mined. As miners race to reach consensus earlier, the difficulty value grows exponentially, and so does the power consumption. Since the beginning of Bitcoin, the year of 2009, until June 2017, the difficulty of Bitcoin grew from 1 to over $5:08 \times 10^{12}$. Suppose only one computer was used in the beginning of Bitcoin network. Nowadays roughly every person in the world simultaneously uses more than 666 of the same computers for mining. More charts of Bitcoin statistics are also available online.

The mined block records the transactions the miner chose before mining, e.g. the earlier ones or the ones with higher transaction fee, and the block might be broadcast to the other miners for confirmation. Note that the mined block might be broadcast later or never. If the block and its transactions have been verified by a miner, the miner might accept and confirm the block to the blockchain, then continue to mine for the next block. The transactions in the confirmed block will be removed from the transaction pool of the verifying miner to mine for the next block. Note that each miner might reject the arriving new blocks and continue mining his/her own block. Confirming a block means appending it to the local copy of blockchain, allowing for retrieval by other users. A transaction has one confirmation when the block it resides in is confirmed. For each subsequent block confirmed, the transaction has one more confirmation. Because of the concurrency, block mining protocol and inevitable network delay, the miners might accept more than one blocks before mining the next one. Actually, blocks with a timestamp greater than 2 hours from the current network time and earlier than the median time of the past 11 blocks are rejected. This can reduce the number of confirmation to avoid attacks.

The very first block is called the genesis block. The main chain of a blockchain is the chain of blocks with the largest accumulative difficulty value from the genesis block. The honest miners always choose to append a new block at the end of the main chain. Therefore, the miners might have different views of a blockchain and a blockchain might fork a branch sometimes. However, after some block confirmations, the main chain will be consistent. The forked blocks not in the main chain will be still kept in the blockchain. Since only one main chain is maintained and all transactions are verified by peer users, double-spending of a transaction can be very likely prevented after some confirmations. Therefore, Bitcoin blockchain is an open decentralized ledger that can securely record transactions between any two parties. Of course, the less confirmation time, the higher the satisfaction of users. However, there is no 100% guarantee of no double-spending.

While only few countries accept bitcoin as a legal currency, most others have banned or restricted it, e.g. as a kind of expensive goods. Because, in addition to some unsolved attacks, there are still problems in economics, politics, performance, etc., more briefed later. To win the mining race, some miners adopt hardware assistance, such as GPU or ASIC, aggravating the growth of difficulty. The ASIC, application-specific IC, runs even faster than GPU, graphics processing unit. Without constraining the growth of difficulty, the computing power consumed for mining keeps growing exponentially. Recently, the Bitcoin network consumes over twenty million US dollars daily in electricity. However, most of the time, there are only fewer than 10 transactions per second (TPS). The computing is very not green at all.

In Ethereum, a new PoW, Ethrash, which is ASIC resistant but GPU favorable, was proposed to reduce mining racing. A new consensus protocol, GHOST, was also proposed to shorten block time into 12 seconds. The confirmation time is reduced but the TPS is still low, even fewer than 1 at the beginning. Other altcoins also propose different consensus protocols, such as proof of stake, where altcoins are Bitcoin alternatives with uninteresting small changes. However, departing from the original definition of proof of work, they might not reflect that there is enough work done autonomously to fulfill the original request, more briefed later. Instead of just serving for digital currencies, blockchain was recently applied to many other areas, such as smart contract in Ethereum. A smart contract is a computerized transaction protocol that executes the terms of a contract. Ethereum blockchain enforces the correct execution of smart contracts in blockchain transactions on Ethereum Virtual Machine. Blockchain already creates a new hype, called "the most significant innovation since the Internet". However, similar problems and attacks are left to be solved because some influential factors such as how much work has been done by individuals are not known or are inestimable in real-time.

To reach consensus, Bitcoin adopts proof of work and how much work is done individually can only be estimated in average in a long run.

A. Proof of Work

PoW is represented by a piece of data sent from a requester to the PoW service provider. The key feature of PoW is the work must be moderately hard (but feasible) on the requester side but easy to check for the service provider. It was first proposed to prevent junk mails by doing some significant work before sending the email. For the hash-based PoW as in Bitcoin, the PoW is to prove that enough computing work has been done so that the winner can append a new block. The same principle requiring certain amount of "work" applies to proof of space, proof of bandwidth, and proof of ownership as well. However, proof of stake is different in that it just needs to provide a more deterministic proof of "wealth", e.g. amount or "age" of coin or how long a coin has been created.

B. Consensus Protocol

With the proof of work, proof of stake, or other means, a consensus protocol is to decide who or what wins the right to append a block, write a ledger, or do something else. For example, in Bitcoin, the first miner with a low hash value wins and appends the block on the main chain. Byzantine fault tolerance (BFT) is another consensus protocol by voting in a faulty distributed system. It might not be very scalable because there are a lot of voting messages, which might be faked, and it needs to wait for most of the messages to arrive to make a decision. Moreover, BFT miners need to be identified, i.e. they are permissioned.

C. Types of Blockchains 1) public blockchain: Anyone can participate.
2) consortium blockchain: The miner is permissioned with enough authority.
3) private blockchain: Not anyone can participate.

To be really trustful and decentralized without colluding, any user should be able to participate freely. However, to be trackable or responsible, user identification might be necessary but this is against privacy. Therefore, semi-permissioned where the identification can be checked in a decentralized and encrypted manner is desirable.

D. Weaknesses

For those systems using randomization to reach fairness in the long run, attacks might happen if we do not wait enough time for confirmation. For example, hashing of PoW in Bitcoin is similar to random number generating. The PoW has at least the following weaknesses.

1) 51% attack: One party has more than 50% total mining power. Eventually, it can redefine the main chain, where data are still immutable but some could be excluded.
2) double-spending: The same transaction is issued again after the first transaction has finished, e.g. cashout before enough confirmations. It is done by redefining the main chain to exclude the first transaction.
3) Sybil attack: Divide oneself into more participants. It might forge identification.
4) Selfish mining: Delay broadcasting of mined block to get more percentage of average reward than honest ones.
5) Eclipse attack: Some nodes might be isolated by neighbors delaying new arriving blocks.
6) Balance attack: In a consortium blockchain using BFT, double-spending might happen with much lower than 50% of mining computing power in two groups of nodes with about the same computing power.

E. Problems 1) politics: The government would not like to be exposed to attacks, let anyone to participate in operating, or lose control of a legal currency.
2) economics: Terms such as rewards, fees, or taxes lack quantifiers of user work, government policies, etc. to form a complete economic formula or model.
3) performance: Hundreds or thousands of times of TPS might be needed. Blockchain size is too big and, for general use, it cannot keep growing unlimitedly.
4) privacy: Any user can see any data in blockchain but most users would not like to reveal private information.

F. Challenges

The challenges mostly come from dishonest adversaries. For blockchains to be a real trust machine, the permissioned approach is questionable because anyone might be somewhat dishonest sometimes, especially when the identification is known to act in collusion. However, if we allow anyone without identification to participate, we need to know them more quickly before they do any damage. Data mining on a blockchain can help a lot to retrieve information to improve the security, but it might be too late. How to know participants better in real-time with little information is challenging. One metric might be how much they had worked in the PoW system. This is also the motivation to provide a new PoW system. Zero-knowledge proof was applied in blockchain to enforce honest behavior while maintaining privacy. It is also challenging because it needs a lot of computing power.

SUMMARY OF THE DISCLOSURE

In response to the above-referenced technical inadequacies, the present disclosure provides a method to calculate a number of proof-of-work to measure how much work has been done individually in a block mining.

In one aspect, the present disclosure provides a method for calculating a number of proof-of-work in one block mining. The method for calculating a number of proof-of-work in one block mining, includes the following steps: using a low hash, wherein the low hash value corresponding to a low nonce is not greater than a predetermined target value; using a high hash, wherein the high hash value corresponding to a high nonce is lower than the same target value; and calculating the number of proof-of-work according to the low hash and the high hash. The low hash value is the lowest hash value in one block mining. The high hash value is the highest hash value in the same block mining.

Therefore, the EPoW of the present disclosure is an estimable PoW, where it can quantitatively estimate how much work is done individually in closed formulas in real-time. Furthermore, the EPoW of the present disclosure conducts simulations to measure the variance and standard deviation of estimations. The EPoW of the present disclosure and corresponding consensus protocol might serve as a new instrument such that the blockchain problems and attacks might be relaxed or solved economically.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which:

FIG. 3 is a list diagram of the statistics of P(i,j|m) according to the EPoW of the present disclosure.

DETAILED DESCRIPTION OF THE EXEMPLARY EMBODIMENTS

Figure 1:
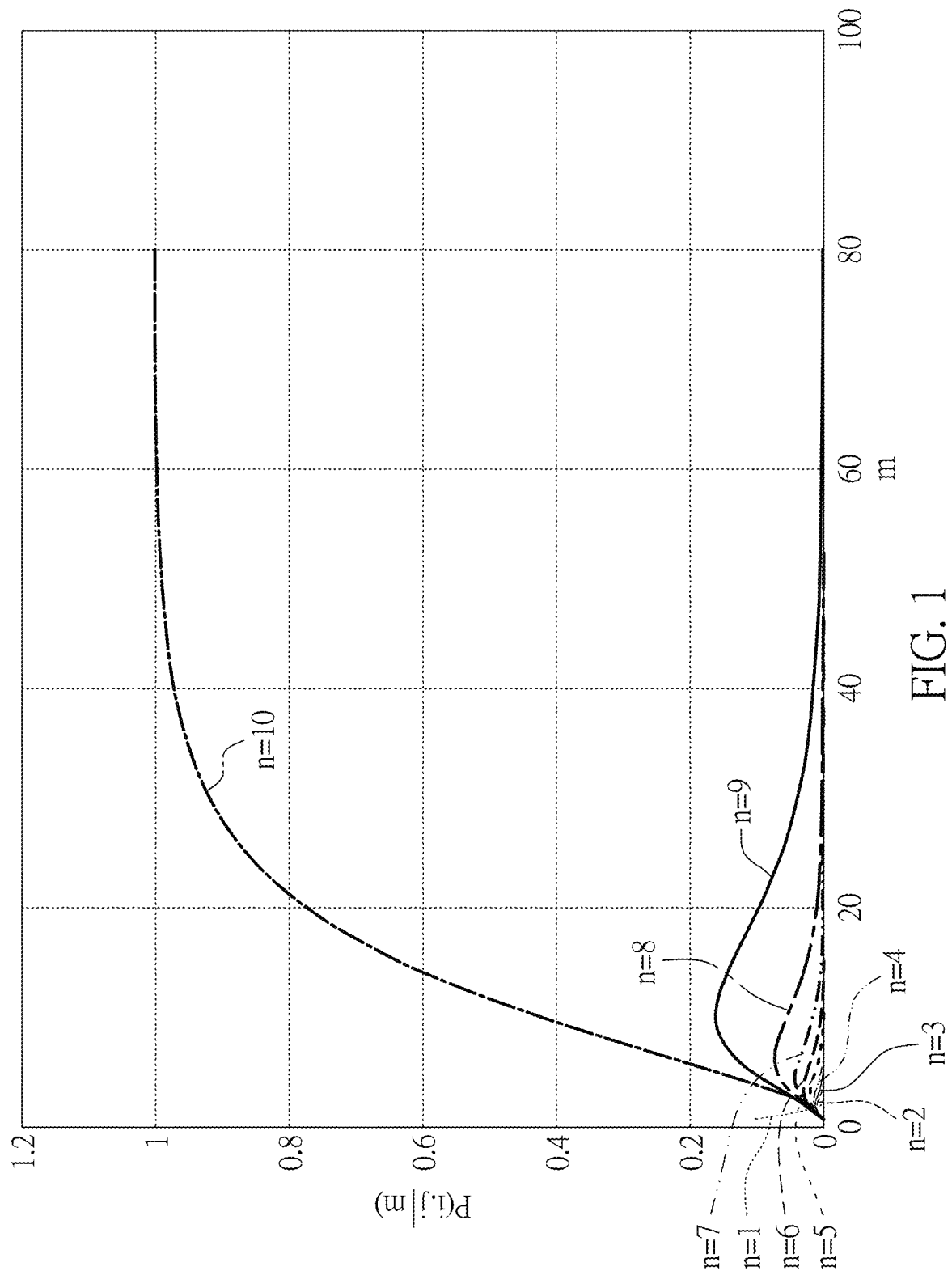
FIG. 1 is a schematic diagram of the probability of less than 100 nonce trials with N=10 according to the EPoW of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the embodiment, EPoW of the present disclosure is an estimable PoW such that how much work was done can be estimated in closed-form formulas. The requirement of a closed-form formula arises from the concern that the numbers involved are usually very big. According to the source code, Bitcoin uses the hash function SHA256, with hash range $2^{256} \cong 1.158 \times 10^{77}$. Since the work is hard by definition, it is not clear whether there always exists a closed-form estimation. For the PoW in Bitcoin, the service provider can easily check that some hard work was done by the service requester but does not know how much work has been done quantitatively. If we would like to convert the PoW into EPoW, instead of just providing one nonce value as PoW, two nonce values, i.e. a low nonce and a high nonce are needed in EPoW. The low nonce generates a hash value, called low hash, less than the other hash value, called high hash, generated by the high nonce in the same block mining. The value range from low hash to high hash is called trial range. If low hash and high hash are the lowest hash value and the highest hash value ever generated, respectively, we can estimate how many times the nonces have been tried, called nonce trials, by trial range. It is an estimation of how much work has been done and the estimation can be figured out in closed-form formulas.

If the low hash is not the lowest one, the high hash is not the highest one, or the same nonce is tried more than once, the nonce trials might be underestimated. If we grant the miner of larger nonce trials more rewards, honest miners would not like to underestimate the nonce trials. Note that underestimating on purpose might be a new attack. Long-term statistics might be able to relax the underestimation. Since we need to try nonces to get the desired hash values, it is very difficult to fake untried lower or higher hash values. Because nonce trials increase with trial range, it is very unlikely to overestimate nonce trials. Before we prove the correctness of EPoW, we need to prove the following Lemma.

Lemma:

Suppose integers 1 to N are uniformly generated with the same probability p=1/N. At the m-th generation, P(i,j|m), the probability of the minimum ever generated being i and the maximum being j, where $1 \le i \le j \le N$ and the range n=j−i+1, is $$\begin{cases} p^m, i = j \\ (n^m - 2(n-1)^m + (n-2)^m)p^m, \text{otherwise} \end{cases}$$

Proof: The proof was first presented in the EPOW paper in ATC 2017. It can be much simpler by the inclusion-exclusion principle as follows.

For i=j, it is trivial that P(i,j|m)=p. For i<j, the probability of generating m times by numbers i through j is $(np)^m$. P(i,j|m) is the probability of generating m times by numbers i through j excludes i+1 through j and i through j−1, respectively, plus i+1 though j−1. That is $((n^m - (n-1)^m - (n-1)^m + (n-2)^m)p^m = (n^m - 2(n-1)^m + (n-2)^m)p^m$.

P(i,j|m) is only dependent on n and m, while p is a constant, 1/N. We can check that $$\sum_{i,j} P(i, j | m) = 1.$$

Assume the hash function used in PoW is perfect, and it behaves like a fair random number generator. According to the above Lemma, using EPoW, the probability of the trial range after m-th trial has a closed-form formula. As shown in FIG. 1, w.l.o.g. for easier description with N=10 and m<100, the general shape will be similar regardless of N and with big enough m.

Except the biggest range n=N=10, the other probabilities are relatively very low and soon drop near 0 after about 50 trials. However, as N increases, if m is relatively small, the probability of n=N are also very low. The current, July 2018, hash rate of Bitcoin network, $2.5 \times 10^{22}$ hashes per 10 minutes, can be a good reference value of m. It is relatively small compared to $N \cong 1.158 \times 10^{77}$, and we shall focus on the very left part of FIGS. 1 and 2.

Figure 2:
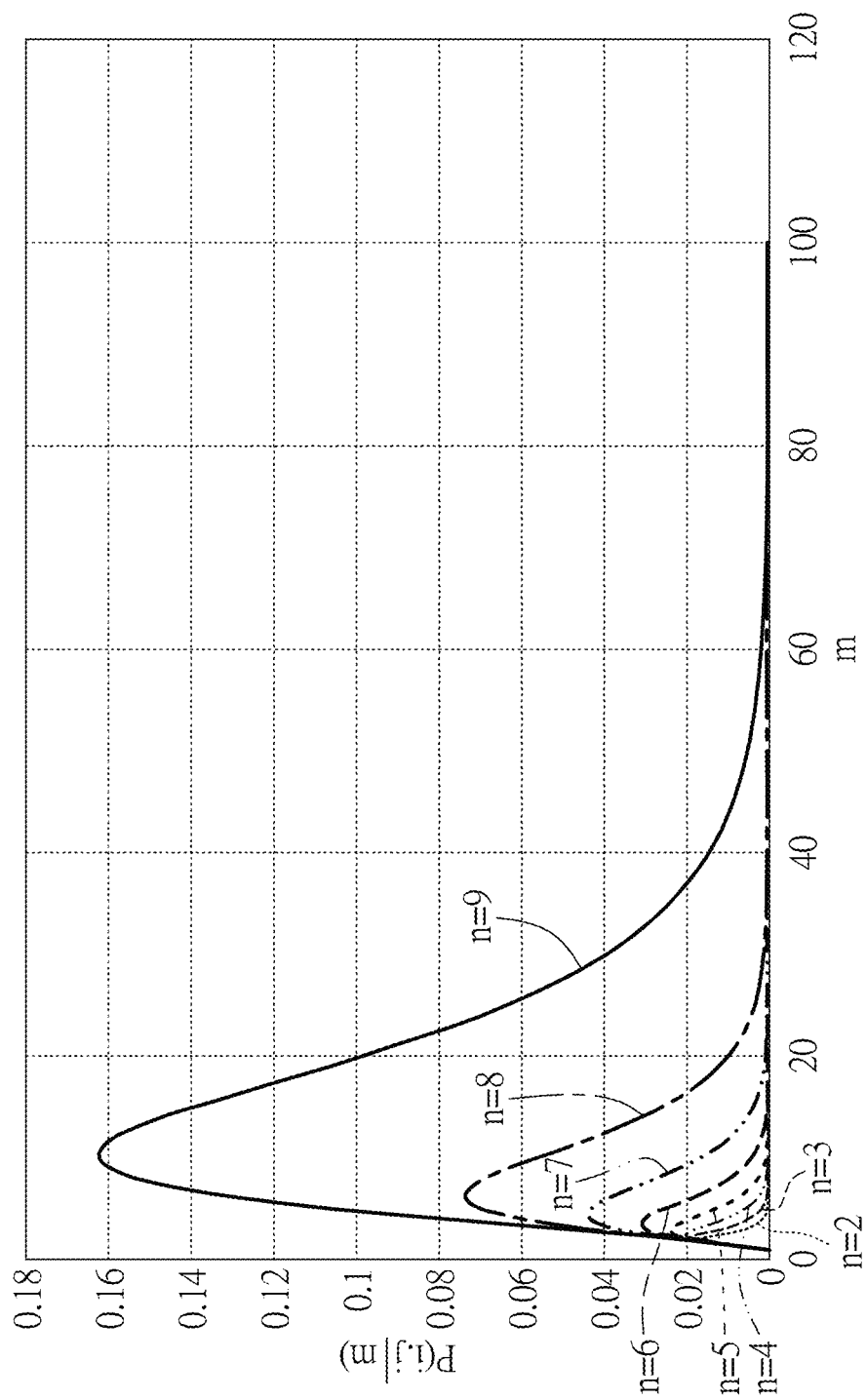
FIG. 2 is a schematic diagram of the normal cases of FIG. 1.

For clarity, FIG. 2 is FIG. 1 scaled after removing the rare n=1 and n=N cases. For each n, the m with the highest probability could be a quick estimation of nonce trials. Since the probability distribution skews a lot, other estimation might be more convincing to distinguish how much work has been done. Actually, $\overline{m}$, the average nonce trials might be a better estimation.

As shown in FIG. 3, we have different statistics by P(i,j|m). P(n|m) is the probability of a given trial range n after the m-th trial. Since $\Sigma_n P(n|m)=1$, the m value, where the average n, $$\overline{n} = \sum_{k=1}^{N} kP(n \mid m),$$

is equal to the given trial range, might be a good estimation of $\overline{m}$. In the embodiment, the $\overline{n}$ contains a Faulhaber's formula, $$\sum_{k=1}^{N} k^m.$$

When N is large, it is not computationally feasible. However, approximating in closed-form formulas is still possible, as the integral bounds of $S_m(x)$ shown in FIG. 3, providing that some computation is acceptable.

Figure 4:
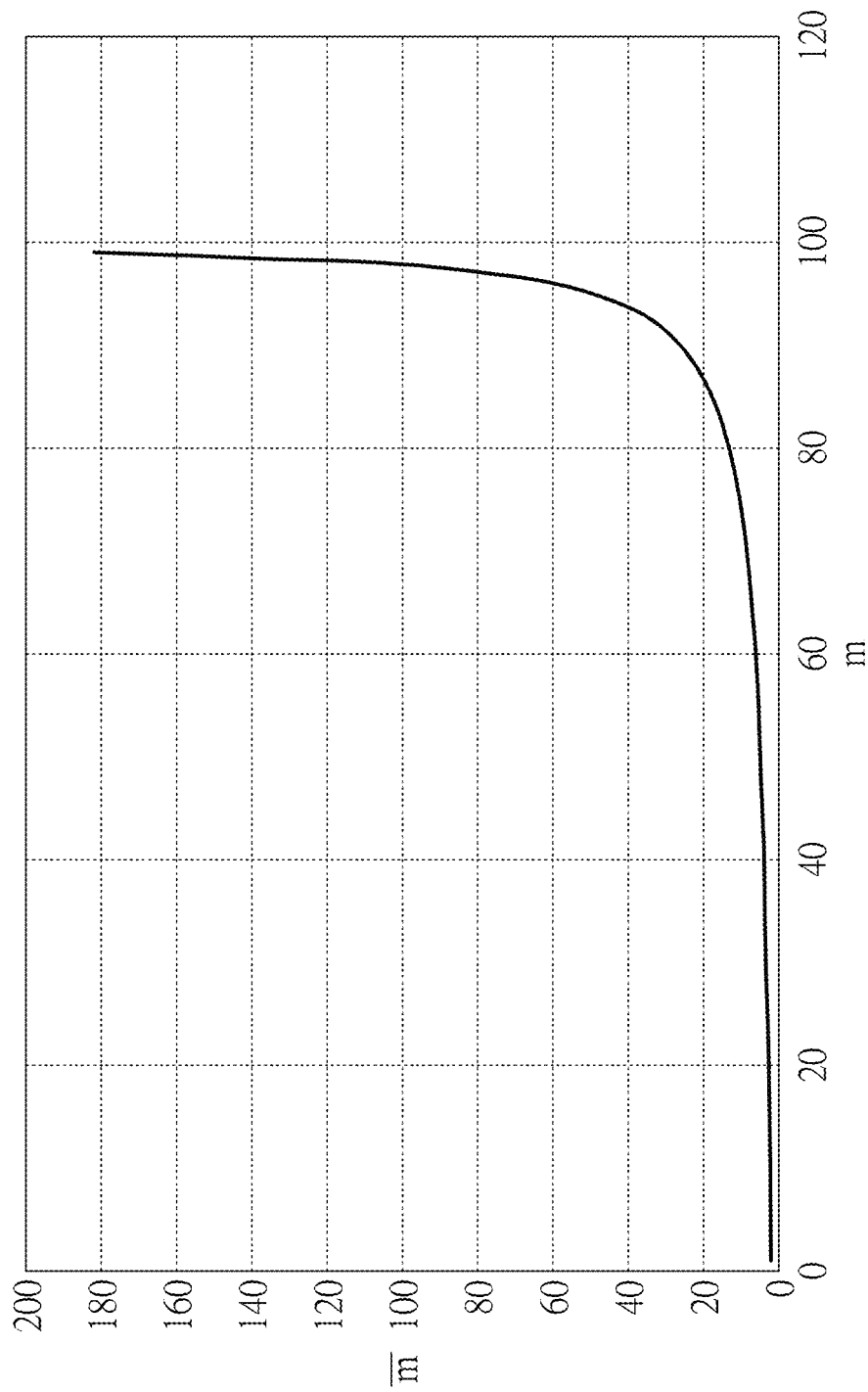
FIG. 4 is a schematic diagram of work estimation $\overline{m}$ with N=100 according to the EPoW of the present disclosure.

Assuming the trials are done uniformly at a fixed rate as in the Lemma above, the probability of m-th trial, P(m), is a constant. By Bayes' theorem, the probability of nonce trials on given i and j, $P(m|i,j) \cong P(i,j|m)P(m)/P'(i;j)=P(i,j|m)/P(i,j)$, where $$P'(i, j) = \sum_{m=1}^{\infty} P(i, j \mid m)P(m) \text{ and } P(i, j) = \sum_{m=1}^{\infty} P(i, j \mid m)P(m).$$

$$\overline{m} = \sum_{m=1}^{\infty} mP(m \mid i, j)$$

is a better estimation and a closed formula. As shown in FIG. 4, the estimation of trials m grows exponentially, as the trial range n goes near 100, when N=100. In practice, N is very big, so is n. Therefore, there should be enough values of $\overline{m}$ to distinguish how much work was done.

Since the trials are basically random in nature, the variance is large. In our simulation, $N=2^{256}$, the standard deviation of $\overline{m}$ grows linearly from 0 to 0.63 times of $\overline{m}$, when n goes to N. The 95% confidence interval is around 1 to 4 standard deviations. The variance can be lowered if we allow removing the extreme, too big or too small, samples. Note that we need to modify the GMP big number library in 64 bit Linux to show the big numbers.

For hash-based PoW, it follows the Lemma above and the probability for estimation is in closed-form formulas. Assuming the hash-based trials in proof of work are conducted at a constant rate, so that the Bayes' theorem can be applied to estimate the average trials. We can map the estimation values into different groups and assign a new representing value for each group, so that the number of representing values are limited. In the worst case, a table of the representing values with an acceptable look-up complexity can be built. Therefore, it is feasible and estimable.

Since we only would like to estimate how much work was done, it does not need to be very accurate. However, an instrument to distinguish quantitatively is definitely necessary. For non-hash-based PoW, if the estimation can be in closed-form formulas, EPoW is also feasible.

Application to EPoW

EPoW provides an estimation value indicating how much work has been done. The value might represent the mining reward directly but in the real world many factors are not reflected. For example, the Cobb-Douglas production function (CDPF), Suggests $Y=AL^\beta K^\alpha$, where Y=total production (the real value of all goods produced in a year)

L=labor input (the total number of person-hours worked in a year)

K=capital input (the real value of all machinery, equipment, and buildings)

A=total factor productivity

α and β are the output elasticities of capital and labor, respectively. These values are constants determined by available technology.

Even though the CDPF is a simplification of the real world, it is widely used. We further simplify it here for easier discussion. Suppose $AK^\alpha$ can be a constant 1 relative to the labor input $L^\beta$ in a period of time, i.e. $Y=L^\beta$, and the production in PoW can be linearly rewarded (or sold). The work can be linearly quantified as labor input and the work in Bitcoin blockchain can also be directly measured by computing power. Then, the reward and computing power in Bitcoin blockchain should also follow CDPF. Since Bitcoin provides the miners a constant block subsidy and variable transaction fees as reward, it is reasonable that we only control the percentage of the reward granted to the miners. Therefore, we assume the mining reward is 1 or 100% initially, scaling it by a better distribution of the reward afterward. L can thus stand for the estimated nonce trials $\overline{m}$ and Y stands for the control percentage.

Because of the hash-based randomization, the probability to get the reward is linear to computing power in Bitcoin. Therefore, Bitcoin has β=1. It is an ideal number that miners would not like dividing their computing power similar to the Sybil attack, nor combining into a mining pool as a monopoly because the average reward is the same in the long run, no matter how the difficulty grows. However, in reality, miners join mining pools because the facility might be more cost effective than individuals and miners can save the maintenance cost.

Figure 5:
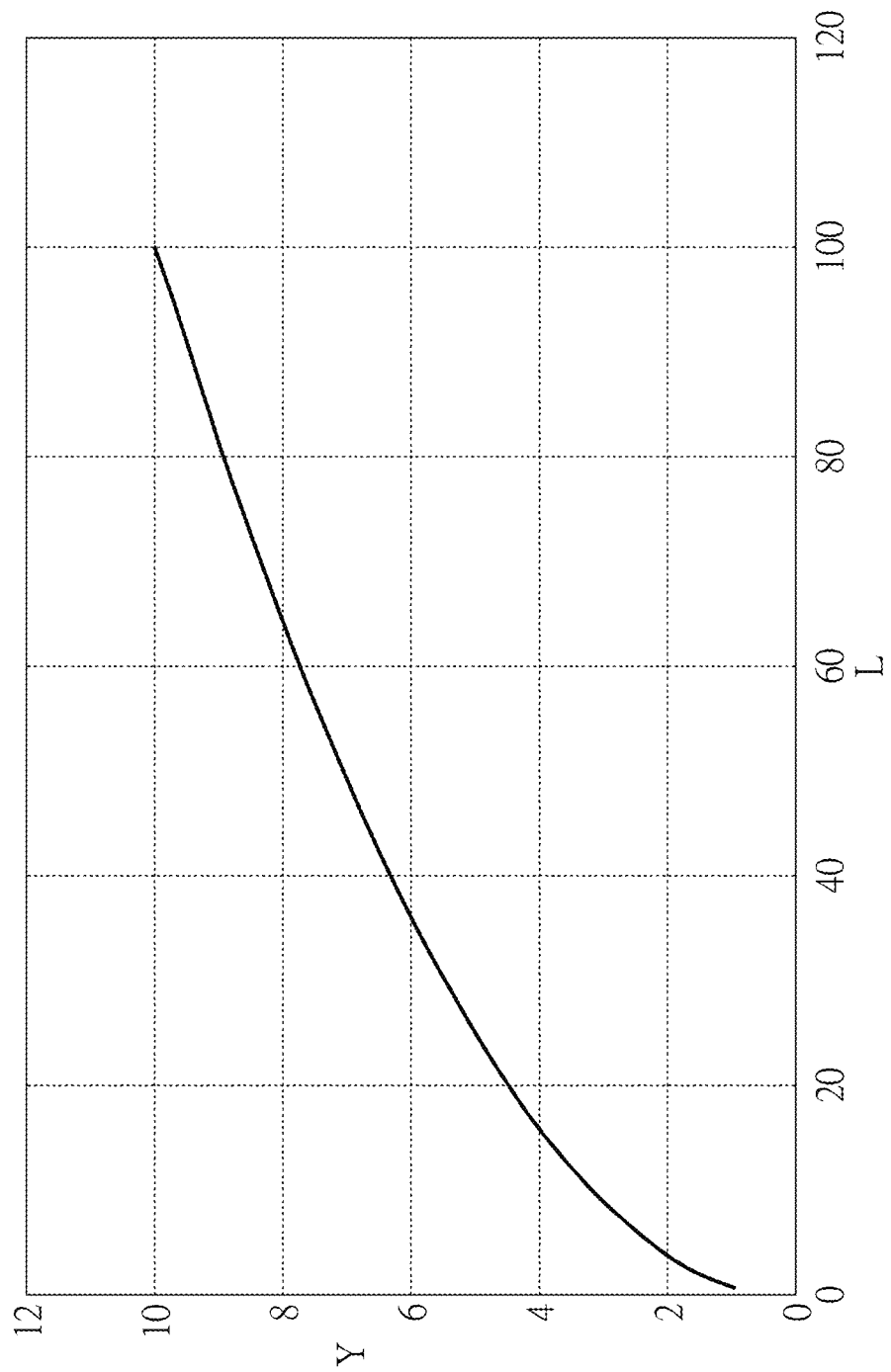
FIG. 5 is a schematic diagram of production $Y=L^\beta$, when $\beta=0.5$, according to the EPoW of the present disclosure.

In the law of diminishing marginal returns, the marginal product initially increases when more of an input (say labor) is employed, keeping the other input (say capital) constant. Here, labor is the variable input and capital is the fixed input. As more and more of variable input (labor) is employed, marginal product starts to fall. Therefore, following the law, $0<\beta<1$. As shown in FIG. 5, $\beta=0.5$.

It is just for explanation, otherwise 0.5 might be too harsh in reality. However, with the same computing power, the Sybil approach is more advantageous for reward when $\beta<1$. On the other hand, monopoly is more advantageous when $\beta<1$. Since we cannot change the probability to get the reward in hash-based PoW, we can control the grant percentage based on the estimated number of trials. Since the reward in Bitcoin is always as $\beta=1$, to achieve any $\beta$ as grant percentage for Bitcoin, we can apply a mapping as $\beta-1$ for the grant percentage. For example, to achieve final grant percentage as $\beta=0.5$, we can apply mapping as $\beta=-0.5$ on Bitcoin.

Figure 6:
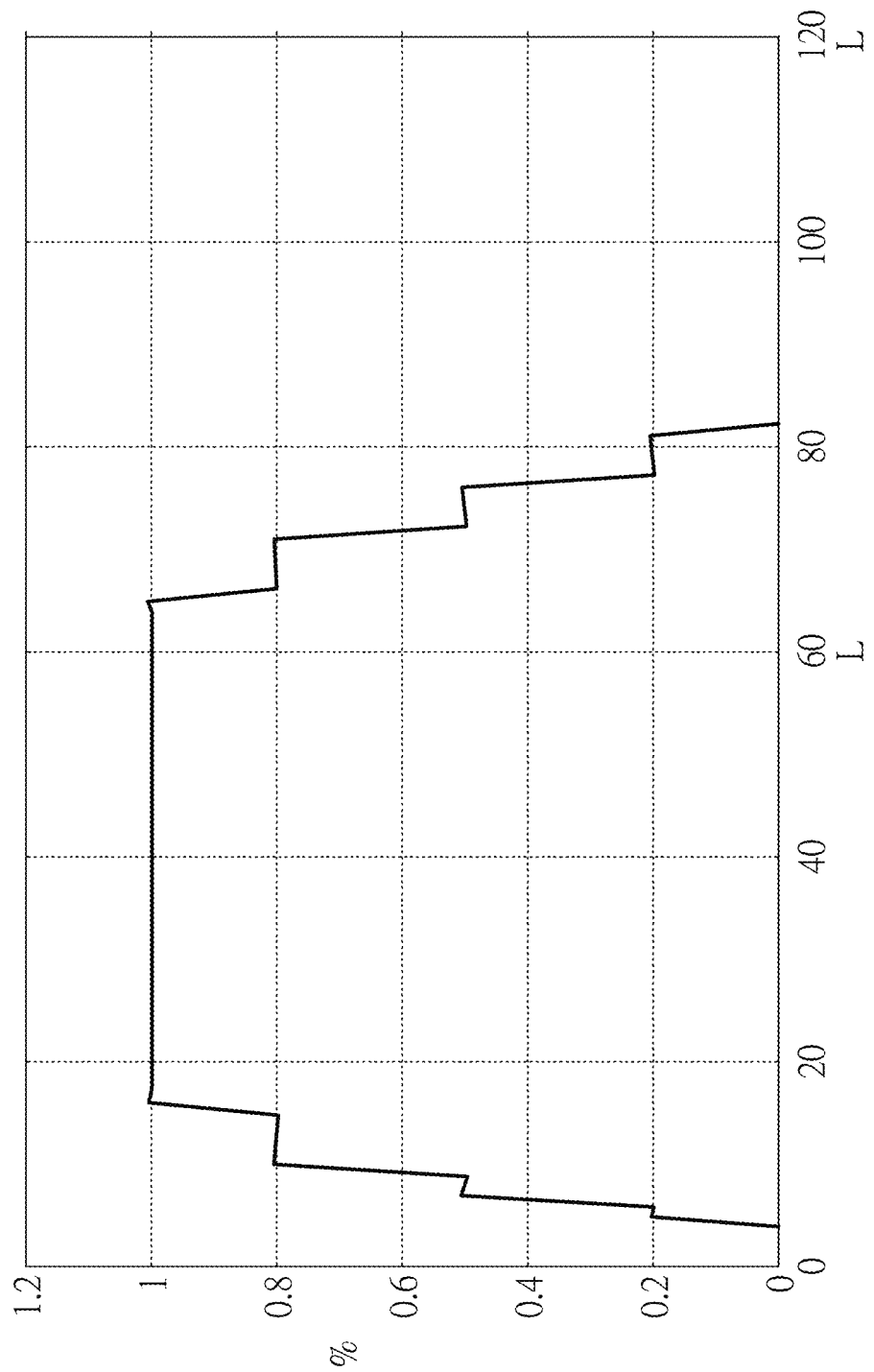
FIG. 6 is a mapping table, $L=\overline{m}$, according to the EPoW of the present disclosure.
Figure 7:
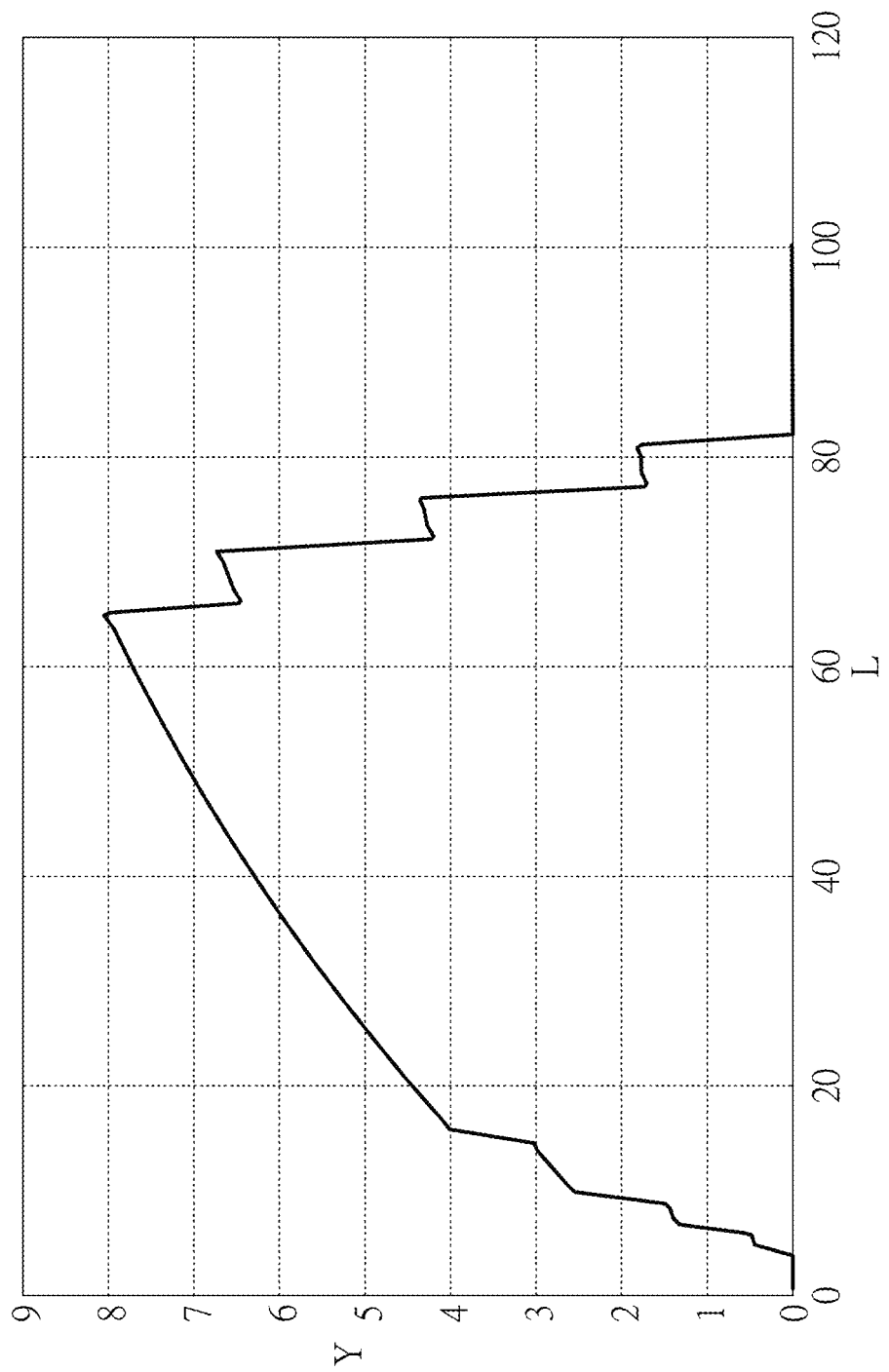
FIG. 7 is schematic diagram of mapped final reward according to the EPoW of the present disclosure.

A mapping table as shown in FIG. 6 might be further applied to divide the trial range into groups or make the percentage control more sophisticated or artificial, where some organizations might prefer. To discourage monopoly, we can zero the percentage for high trials, or even reject the block to avoid 51% attack directly. On the other hand, to discourage opportunism, we can also zero the percentage for low trials, or even reject the block to avoid dishonesty such as selfish mining. Both grouping to zero above can also reduce the variance of trials estimation. The similar grouping at different levels between 0% and 100% or more smooth curve fitting as in FIG. 2 can be applied without significant computation. We can keep the majority in high percentage, not necessarily 100%, to follow the economic laws such as CDPF or diminishing marginal return. Actually, this mapping table plays an important role in customizing blockchains. The final mapping combined with =0.5 and the mapping table as in FIG. 6 is shown in FIG. 7. Then, we can do scaling and finalize the reward. The scaling can use up the reward budget or save some percentage for other usages, such as taxes or extra bonus.

As shown in FIG. 2, when the nonce trial m is small, the probability of different trial ranges varies a lot. Attacks taking advantage of this so that more than 1 confirmations are needed.

As we can reject those blocks with low trials, the trials become more predictable and the number of confirmations needed to avoid attacks, such as double-spending, can be lowered. When we reject those block with high trials, the reward still increases with the computing power, under certain bound. However, it is disadvantageous for miners to increase computing power beyond. Therefore, the difficulty will drop even with the same block time, and so will power consumption. The computing power can be saved to support other computation-intensive work such as zero-knowledge proof. Mining a block will be easier for the general public except for the ones with very little computing power and block time can also be shortened.

This does not imply higher TPS but encourages miners with minimum computing power to participate. Consequently, more miners can be organized into more big enough groups such as in sharding or Bitcoin-NG to parallelize blockchain for higher TPS indirectly. With the parallelization, in additional to using BFT, scalable storage using PoW can also be practically feasible.

Since the probability for a hash-based PoW trial is fixed, lowering difficulty can shorten the block time but the average reward might be still the same because block time might not be in the reward formulas. The number of confirmations might increase, but the block time might also be shortened. The total confirmation time might be shortened depending on the final reward mapping. Actually, different combinations of mapping tables or even changing dynamically might further prevent the Sybil or other attacks.

The above EPoW of the present disclosure may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components which may represent or be integrated in any of the above-described components, etc.

Figure 8:
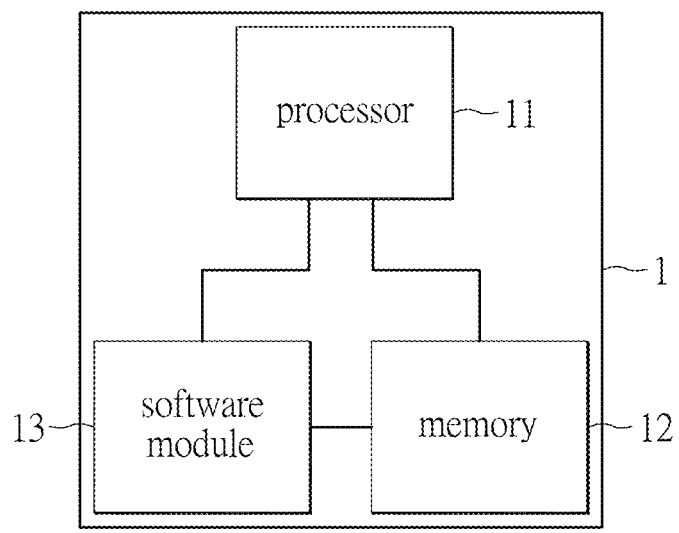
FIG. 8 is a schematic diagram of an electronic device according to the EPoW of the present disclosure.

Referring to FIG. 8, an electronic device 1 includes a processor 11, a memory 12 and a software module 13. In the embodiment, the electronic device 1 is connected to the network. The processor 11 and the memory 12 may be discrete components that are used to execute an application or set of operations as described herein. The application may be coded in software in a computer language understood by the processor 11, and stored in a computer readable medium, such as, a memory 12. The computer readable medium may be a non-transitory computer readable medium that includes tangible hardware components, such as memory, that can store software. Furthermore, a software module 13 may be another discrete entity that is part of the electronic device 1, and which contains software instructions that may be executed by the processor 11 to effectuate one or more of the functions described herein. In addition to the above noted components of the electronic device 1, the electronic device 1 also includes a communication module (not shown) to receive and transmit communication signals.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

According to above, the EPoW of the present disclosure is an estimable PoW, where it can quantitatively estimate how much work is done individually in closed formulas in real-time. Furthermore, the EPoW of the present disclosure conducts simulations to measure the variance and standard deviation of estimations. The EPoW of the present disclosure and corresponding consensus protocol might serve as a new instrument such that the blockchain problems and attacks might be relaxed or solved economically.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method related to two numbers of proof-of-work in one block mining, the method being executed in a computer connected to a network, the method comprising:

converting a proof-of-work of a block for one block mining into an estimable proof-of-work of the block, comprising:

obtaining a low hash value in the blocking mining, wherein the low has value corresponding to a low nonce is not greater than a predetermined target value, and the low hash value is generated by using the low nonce in a hash function of the block mining;

obtaining a high hash value in the same block mining, wherein the high hash value corresponding to a high nonce is higher than the predetermined target value, and the high hash value is generated by using the high nonce in the hash function of the block mining; and determining a number of the estimable proof-of-work according to the low hash value, the high hash value, and a closed-form formula, wherein the number of the estimable proof-of-work indicates an estimated computing power; and rejecting the block according to the estimated computing power;

wherein the low hash value is the lowest hash value in the block mining, the high hash value is the highest hash value in the same block mining;

wherein the estimated computing power in the block is determined according to a range between the low hash value and the high hash value;

wherein a probability of the low hash value and the high hash value at the number of nonce trials is used for estimating the number of average nonce trials in the block mining;

wherein the probability of the low hash value and the high hash value at the number of trials is determined as the following closed-form formula:

$$\begin{cases} p^m, & i = j \\ (n^m - 2(n-1)^m + (n-2)^m)p^m, & \text{otherwise} \end{cases}$$

wherein, i is the lowest hash value, j is the highest hash value, $1 \le i \le j \le N$, N is an integer larger than 2, n is the range and $n = j - i + 1$, m is the number of nonce trials, indicating how much work has been done in the block mining.

2. The method related to two numbers of proof-of-work in one block mining of claim 1, wherein assume a probability of m-th nonce trial is a constant, the probability of nonce trials on given i and j is determined according to the following formula:

P(m|i,j)(=P(i,j|m)*/P'(i,j)=P(u,j|m)/P(i,j);

wherein $$P'(i, j) = \sum_{m=1}^{\infty} P(i, j \mid m) P(m) \text{ and } P(i, j) = \sum_{m=1}^{\infty} P(i, j \mid m) P(m);$$

wherein P(m) is the probablity of m-th nonce trial, P(m|i, j) is the probability of nonce trials on given i and j, P(i,j in) is the probability of given i and j at the m-th trial.

3. The method related to two numbers of proof-of-work in one block mining of claim 2, wherein the number of average nonce trials in the block mining is determined according to the following formula:

$$\bar{m} = \sum_{m=1}^{\infty} m P(m \mid i, j).$$

* * * * *